United States Patent
Bascom et al.

(10) Patent No.: US 7,229,937 B2
(45) Date of Patent: *Jun. 12, 2007

(54) REINFORCED NONWOVEN FIRE BLOCKING FABRIC, METHOD FOR MAKING SUCH FABRIC, AND ARTICLES FIRE BLOCKED THEREWITH

(75) Inventors: Laurence Nelson Bascom, Amelia, VA (US); Warren F. Knoff, Richmond, VA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/806,584

(22) Filed: Mar. 23, 2004

(65) Prior Publication Data

US 2005/0215142 A1  Sep. 29, 2005

(51) Int. Cl.
*B32B 27/12* (2006.01)
*B32B 27/04* (2006.01)

(52) U.S. Cl. .............. 442/2; 442/35; 442/36; 442/43; 442/46; 442/49; 442/50; 442/57; 442/58; 442/136; 442/164; 442/169; 442/352; 428/920; 428/921

(58) Field of Classification Search ........... 442/2, 442/35, 36, 43, 46, 49, 50, 57, 58, 136, 164, 442/169, 352; 428/920, 921
See application file for complete search history.

(56) References Cited

U.S. PATENT DOCUMENTS

| | | |
|---|---|---|
| 3,118,750 A | 1/1964 | Dunlap et al. |
| 3,193,602 A | 7/1965 | Leonard et al. |
| 3,546,056 A | 12/1970 | Thomas |
| 3,565,749 A | 2/1971 | Wizon |
| 3,597,299 A | 8/1971 | Thomas et al. |
| 3,748,302 A | 7/1973 | Jones |
| 3,767,756 A | 10/1973 | Blades |
| 3,819,465 A | 6/1974 | Parsons et al. |
| 3,869,429 A | 3/1975 | Blades |
| 3,869,430 A | 3/1975 | Blades |
| 4,743,495 A | 5/1988 | Lilani et al. |
| 4,748,065 A | 5/1988 | Tanikella |
| 4,840,838 A | 6/1989 | Wyss |
| 5,153,056 A | 10/1992 | Groshens |
| 5,208,105 A | 5/1993 | Ichibori et al. |
| 5,316,834 A * | 5/1994 | Matsuda et al. ............ 442/247 |
| 5,417,752 A | 5/1995 | Paren et al. |
| 5,470,648 A | 11/1995 | Pearlman et al. |
| 5,506,042 A | 4/1996 | Ichibori et al. |
| 5,691,036 A | 11/1997 | Lin et al. |
| 6,383,623 B1 | 5/2002 | Erb, Jr. |
| 6,579,396 B2 | 6/2003 | Erb, Jr. |
| 6,596,658 B1 | 7/2003 | Putnam et al. |
| 6,790,795 B2 | 9/2004 | Erb et al. |
| 6,955,193 B2 * | 10/2005 | Hainsworth et al. ..... 139/426 R |
| 2002/0098753 A1 | 7/2002 | Latham et al. |
| 2002/0134484 A1 | 9/2002 | Erb, Jr. |
| 2002/0182967 A1* | 12/2002 | Erb et al. ................... 442/415 |
| 2003/0213546 A1 | 11/2003 | Hartgrove |
| 2003/0232560 A1* | 12/2003 | Corner ....................... 442/401 |
| 2004/0028958 A1* | 2/2004 | Assink et al. ............... 428/920 |
| 2004/0060119 A1 | 4/2004 | Murphy et al. |
| 2004/0198125 A1 | 10/2004 | Mater et al. |

FOREIGN PATENT DOCUMENTS

| | | |
|---|---|---|
| EP | 0 622 332 B1 | 8/1998 |
| EP | 1 126 066 A1 | 8/2001 |
| FR | 2 761 381 | 10/1998 |
| GB | 1064271 | 10/1978 |
| WO | WO 92/17629 | 10/1992 |
| WO | WO 98/42905 | 1/1998 |
| WO | WO 03/023108 A1 | 3/2003 |
| WO | WO 03/049581 A2 | 6/2003 |

* cited by examiner

*Primary Examiner*—Ula C. Ruddock

(57) ABSTRACT

This invention relates to a thin reinforced nonwoven fabric for fire blocking an article, articles containing such fabrics, and methods for making the fabrics and fire blocking the articles. When exposed to heat or flame, the fabric is capable of increasing its thickness by at least three times. The fabric comprises an open mesh scrim having a having crimped, heat-resistant organic fibers compressed thereon and held in a compressed state by a thermoplastic binder. When subjected to high heat or flame, the binder in the structure softens and flows, releasing the restrained crimped fibers and allowing the thickness of the fabric to increase dramatically.

12 Claims, No Drawings

REINFORCED NONWOVEN FIRE BLOCKING FABRIC, METHOD FOR MAKING SUCH FABRIC, AND ARTICLES FIRE BLOCKED THEREWITH

BACKGROUND OF THE INVENTION

1. Field of the Invention

This invention relates to a thin reinforced nonwoven fabric, made from a compressed web of crimped fiber and a reinforcing scrim, that bulks when exposed to heat or flame and that is useful as a component for fire blocking mattresses, upholstery, and the like. This invention further relates to a fire-blocked article incorporating this fabric. This invention also relates to processes for making this reinforced nonwoven fabric and incorporating the fabric into an article.

2. Description of Related Art

The State of California has led the drive to regulate and reduce the flammability of mattresses and mattress sets in an attempt to reduce the number of lives lost in household, hotel, and institutional fires. In particular, the Bureau of Home Furnishings and Thermal Insulation of the Department of Consumer Affairs of the State of California issued Technical Bulletin 603 "Requirements and Test Procedure for Resistance of a Residential Mattress/Box Spring Set to a Large Open-Flame" to quantify the flammability performance of mattress sets. In many cases, mattress makers want to include a layer of fire blocking, however, they do not want that additional layer to detract from the existing aesthetics of their mattresses. Strong thin fabrics, such as a combination of staple fibers and a thin reinforcing scrim fabric, are therefore desired in many instances because they are durable and also are not likely to be objectionable in the intended use.

Various methods are known in the art for combining staple fibers and scrim fabrics that lock the staple fibers in place. One such process is hydro-entangling, also known in various publications as hydrolacing, spunlacing, and water-jet treatments, where high pressure water jets impact the staple fibers and drive them into the scrim, consolidating the fiber and scrim together. Nonwoven sheets made by this process mechanically entangle the staple fibers either with themselves or with the scrim or both, limiting the ability of the fabric to bulk when heated or exposed to flame. The following patents are representative of nonwoven fabrics made primarily by the hydro-entangling process. PCT Publication WO 98/42905 discloses a multilayer textile material consisting of a complex textile grid embedded inside a textile structure consisting of nonwoven laps arranged on either side of the grid, the laps entangled with each other and the grid by the force of hydro-entangling. U.S. Pat. No. 4,840,838 to Wyss discloses a high temperature filter felt of a scrim and batt of fibers entangled into that scrim. U.S. Pat. No. 6,596,658 to Putnam et al discloses a laminated fabric having a three dimensional image, the fabric formed from a lightweight layer of heat-resistant fibers and a heavyweight layer bonded together via hydro-entanglement.

Another process known in the art for combining staple fibers and scrim fabrics is by needlepunching. In this process, barbed needles grab the staple fibers and drive them into the scrim, or into the internal fiber batting, locking together the structure. Again, nonwoven sheets made by this process have their staple fibers mechanically entangled either with themselves or with the scrim, limiting the ability of the fabric to bulk when heated or exposed to flame. Some products made by needlepunching can be made by hydro-entangling, or vice versa, since both products require the entangling of the fibers with and to the scrim and other fibers in the fabrics. The following patents are representative of nonwoven fabrics made primarily by the needlepunching process. U.S. Pat. No. 4,743,495 to Lilani et al. discloses a nonwoven fire blocking seat fabric comprising at least two felted plies comprising aramid fibers and phenolic fibers that are united together with a stabilized woven scrim. U.S. Pat. No. 5,691,036 to Lin et al. discloses a cushioning material having at least two layers of unwoven temperature-resistant staple fibers with layers of reinforcing scrim between the layers, wherein the entire structure is needlepunched for integrity and one face is embossed with a pattern. U.S. Pat. No. 3,819,465 to Parsons et al. discloses a textile construction having a resilient textured surface formed by needlepunching nonwoven fibers into a layer of plastic grid material. The grid is then caused to retract and cause the nonwoven fibers to arch out of the plane of the batt, forming the textured surface. U.S. Pat. No. 5,578,368 to Forsten et al. discloses a fire-resistant material useful in upholstered furniture and mattress tops, comprising a fiberfill batt and a layer of fire-resistant aramid fiber contacting at least one side of the fiberfill batt. Another fire blocking material is made by entangling flame resistant fibers to and with a scrim via hydro-entangling, needlepunching, and/or chemical means, is disclosed in United States Patent Application 2002/0098753 to Latham et al. Such materials are useful for fire blocking aircraft seats.

Still another process known in the art for combining staple fibers and scrim fabric is by adhesive lamination or the addition of binders. In this process, a binder or adhesive is used to either adhere or bind layers or individual fibers together. The following patents are representative of nonwoven fabrics made by this process. U.S. Pat. Nos. 6,579,396 and 6,383,623 to Erb disclose a very low-density insulating material having non-thermoplastic fibers that are bound by a flammable thermoplastic binder. European Patent EP 622 332 to Yamaguchi et al. discloses a heat resistant and flame-retardant cushioning structure comprising a matrix fiber of a bulky nonwoven web of crimped non-elastic staple fiber, a crimped flame-retardant fiber exhibiting residual weight of at least 35% as tested by a glowing test method, and a thermoplastic elastic fiber, with at least some of the intersecting points between the matrix fiber and the flame-retardant fiber with thermoplastic fiber being fusion bonded. The matrix fiber is preferably polyester or aramid fiber, but preferably the polyester contains a flame retardant compound and the preferred aramid fiber is a meta-aramid fiber. The flame-retardant fiber is preferably pre-oxidized acrylonitrile polymer fiber, but can be carbon fiber, crosslinked phenolic resin fiber, or polybenizimidazole fiber. The preferred thermoplastic elastomer fiber is a sheath/core composite fiber made of thermoplastic elastomer and a non-elastic polyester. The Erb and Yamaguchi patents both use the binder to maintain the nonwoven in a lofted or bulked form so that it will have resiliency. U.S. Pat. No. 5,470,648 to Pearlman et al. discloses a three-layered composite fabric for use a carpet backing, the composite fabric made from two layers of entangled nylon filaments adhesively attached to a fiberglass scrim. This fabric has the same problem hydro-entangled or needlepunched fabrics have, that is, because the fibers are mechanically entangled together they lose their ability to bulk when heated or exposed to flame.

What is needed therefore, is a reinforced nonwoven fabric that provides flame protection but is lightweight and thin during normal use but then bulks when subjected to high heat or flame.

SUMMARY OF THE INVENTION

This invention relates to a reinforced nonwoven fabric for fire blocking an article, and an article fire blocked with the nonwoven fabric, wherein the fabric comprises an open mesh scrim having a first side and a second side, the first side having crimped, heat-resistant organic fibers compressed thereon, the fibers held in a compressed state by a thermoplastic binder, wherein when the fabric is exposed to heat or flame, the fabric is capable of increasing its thickness by at least three times.

This invention also relates to a process for making a reinforced nonwoven fabric that bulks in heat or flame for fire blocking an article, comprising the steps of:
  a) forming a mat comprising crimped heat-resistant organic fiber and binder fiber,
  b) contacting the mat with the first side of an open mesh scrim, said scrim having a first and a second side, to form a fabric assembly,
  c) applying binder powder to the fabric assembly,
  d) heating the fabric assembly to activate the binder fiber and binder powder,
  e) compressing the fabric assembly to a compressed state, and
  f) cooling the fabric assembly in a compressed state to form a reinforced nonwoven fabric.

This invention further relates to a fire blocking quilt comprising outer fabric ticking or cover fabric layer; one or more layers of the reinforced nonwoven fabric fire blocker, a cushioning layer of foam or fiber batting, and optionally a stitch-backing layer, wherein the reinforced nonwoven fabric fire blocker comprises an open mesh scrim having crimped, heat-resistant organic fibers compressed thereon, the fibers held in a compressed state by a thermoplastic binder.

This invention also relates to a method of fire blocking an article with a reinforced nonwoven fabric layer that bulks in heat or flame, comprising the steps of:
  a) combining a reinforced nonwoven fabric layer, a fabric ticking or upholstery layer, and optionally a cushioning layer,
  b) sewing the layers together to form a fire blocked fabric quilt, and
  c) incorporating the fire blocked fabric quilt into the article, the reinforced nonwoven fabric layer comprising an open mesh scrim having a first side and a second side, the first side having crimped, heat-resistant organic fibers compressed thereon, the fibers held in a compressed state by a thermoplastic binder, wherein when the fabric quilt is exposed to heat or flame, the nonwoven fabric layer is capable of increasing its thickness by at least three times.

DETAILS OF THE INVENTION

This invention relates to a thin reinforced nonwoven fabric for fire blocking an article. When exposed to heat or flame, the fabric is capable of increasing its thickness by at least three times. The fabric comprises an open mesh scrim having a first side and a second side, the first side having crimped, heat-resistant organic fibers compressed thereon and held in a compressed state by a thermoplastic binder. Preferably organic fibers are compressed on both the first and second sides of the open mesh scrim. When subjected to high heat or flame, the binder in the structure softens and flows, releasing the restrained crimped fibers and allowing the thickness of the fabric to increase dramatically. This increase creates pockets of air in the fabric, which is believed to increase the fabric's thermal performance.

The fabric is capable of increasing its thickness in response to high heat or flame because the crimped heat-resistant organic fibers are compressed but not appreciably entangled in the fabric, while previously developed fiber-scrim sheets have concentrated on ensuring good entanglement of the fibers with the scrim and or with the other fibers in the sheet. Typically, this good entanglement is done by the imparting energy into lofty webs of fibers and/or the scrim that form the sheet to entangle the fibers and densify the sheet. When this is done, the fibers of the sheet are so entangled they are not free to move when subjected to heat and flame.

The fabrics of this invention have only enough entanglement of the fibers to manufacture the sheet; that is, the fibers are only entangled with each other to the extent needed to form a lightweight web that can be overlaid or combined with the open mesh scrim. No additional energy is imparted to the sheet to either entangle the fibers with each other or with the scrim. The lightweight web is then laminated to the scrim by heating and compressing the combination and then cooling the combination to set the structure while the crimped fibers are compressed and restrained. By compressing a lofty sheet in this manner, when the binder material is softened or melts, the fibers in the sheet are free to return to a formally lofty state similar to the one they had prior to compression.

The thickness of the reinforced fabric of this invention increases by at least three times when exposed to high heat or flame. Generally, as the temperature is increased, the rate of bulking is increased and the amount of bulking increases also, and thickness increases of greater than 25 times the compressed thickness have been seen. It is believed that temperatures as low as 150 centigrade are needed to initiate the bulking effect, and it is believed that starting at temperatures of about 225 centigrade the bulking action proceeds immediately. The maximum amount of fabric bulking is achieved when the fabric is subjected directly to flame, where the fabric has been seen to bulk approximately 29 times its original thickness. When directly exposed to flame, the fabric thickness preferably increases at least 5 times, and preferably 10 times its original thickness.

The compressed reinforced nonwoven fabrics of this invention preferably have an overall thickness of 0.025 to 0.12 centimeters (0.010 to 0.050 inches). Such fabrics also preferably have a basis weight in the range of 20 to 136 g/m$^2$ (0.6 to 4 oz/yd$^2$), with the scrim component preferably making up 3.4 to 34 g/m$^2$ (0.1 to 1.0 oz/yd$^2$) and the fibrous web component preferably ranging from 1.7 to 102 g/m$^2$ (0.5 to 3.0 oz/yd$^2$).

The reinforced nonwoven fabric of this invention comprises crimped heat-resistant organic fibers. Such crimped fibers are preferably staple fibers that have cut lengths in the range of 0.4 to 2.5 inches (1 to 6.3 cm) preferably 0.75 to 2 inches (1.9 to 5.1 cm) and preferably have 2 to 5 crimps per centimeter (5 to 12 crimps per inch). By "heat resistant fiber" it is meant that the fiber preferably retains 90 percent of its fiber weight when heated in air to 500° C. at a rate of 20 degrees C. per minute. Such fiber is normally flame resistant, meaning the fiber or a fabric made from the fiber has a Limiting Oxygen Index (LOI) such that the fiber or fabric will not support a flame in air, the preferred LOI range being about 26 and higher. The preferred fibers do not excessively shrink when exposed to a flame, that is, the length of the fiber will not significantly shorten when exposed to flame. Fabrics containing an organic fiber that retains 90 percent of its fiber weight when heated in air to 500° C. at a rate of 20 degrees C. per minute tend to have limited amount of cracks and openings when burned by an impinging flame, which is important to the fabric's performance as a fire blocker.

Heat resistant and stable fibers useful in the reinforced nonwoven fire-blocking fabric of this invention include fiber made from para-aramid, polybenzazole, polybenzimidazole, and polyimide polymer. The preferred heat resistant fiber is made from aramid polymer, especially para-aramid polymer.

As used herein, "aramid" is meant a polyamide wherein at least 85% of the amide (—CONH—) linkages are attached directly to two aromatic rings. "Para-aramid" means the two rings or radicals are para oriented with respect to each other along the molecular chain. Additives can be used with the aramid. In fact, it has been found that up to as much as 10 percent, by weight, of other polymeric material: can be blended with the aramid or that copolymers can be used having as much as 10 percent of other diamine substituted for the diamine of the aramid or as much as 10 percent of other diacid chloride substituted for the diacid chloride of the aramid. In the practice of this invention, the preferred para-aramid is poly(paraphenylene terephthalamide). Methods for making para-aramid fibers useful in this invention are generally disclosed in, for example, U.S. Pat. Nos. 3,869,430, 3,869,429, and 3,767,756. Such aromatic polyamide organic fibers and various forms of these fibers are available from DuPont Company, Wilmington, Del. under the trademark Kevlar® fibers.

Commercially available polybenzazole fibers useful in this invention include Zylon PBO-AS (Poly(p-phenylene-2, 6-benzobisoxazole) fiber, Zylon® PBO-HM (Poly(p-phenylene-2,6-benzobisoxazole)) fiber, available from Toyobo, Japan. Commercially available polybenzimidazole fibers useful in this invention include PBI® fiber available from Celanese Acetate LLC. Commercially available polyimide fibers useful in this invention include P-84® fiber available from LaPlace Chemical.

Alternatively, "heat resistant fiber" can include a cellulose fiber that retains at least 10 percent of its fiber weight when heated in air to 700° C. at a rate of 20 degrees C. per minute. These fibers are said to be char forming. Regenerated cellulose fibers have 10 percent inorganic compounds incorporated into the fibers are the preferred cellulose fibers. Such fibers, and methods for making such fibers, are generally disclosed in U.S. Pat. No. 3,565,749 and British Patent No. 1,064,271. A preferred char-forming regenerated cellulose fiber for this invention is a viscose fiber containing silicon dioxide in the form of a polysilicic acid with aluminum silicate sites. Such fibers, and methods for making such fibers are generally disclosed in U.S. Pat. No. 5,417,752 and PCT Pat. Appl. WO 9217629. Viscose fiber containing silicic acid and having approximately 31 (+/−3) percent inorganic material is sold under the trademark Visil® by Sateri Oy Company of Finland.

The heat resistant fibers can be blended with other fibers, however, it is preferred the other fibers not compromise the fabric's ability to function as a flame blocker. For example, up to 50 percent modacrylic fibers can be blended with the heat resistant fiber. Modacrylic fiber is useful because this fiber releases flame-suppressing halogen-containing gases when burned. By modacrylic fiber it is meant acrylic synthetic fiber made from a polymer comprising acrylonitrile. Preferably the polymer is a copolymer comprising 30 to 70 weight percent of an acrylonitrile and 70 to 30 weight percent of a halogen-containing vinyl monomer. The halogen-containing vinyl monomer is at least one monomer selected, for example, from vinyl chloride, vinylidene chloride, vinyl bromide, vinylidene bromide, etc. Examples of copolymerizable vinyl monomers are acrylic acid, methacrylic acid, salts or esters of such acids, acrylamide, methylacrylamide, vinyl acetate, etc.

The preferred modacrylic fibers used in this invention are copolymers of acrylonitrile combined with vinylidene chloride, the copolymer having in addition an antimony oxide or antimony oxides for improved fire retardancy. Such useful modacrylic fibers include, but are not limited to, fibers disclosed in U.S. Pat. No. 3,193,602 having 2 weight percent antimony trioxide, fibers disclosed in U.S. Pat. No. 3,748, 302 made with various antimony oxides that are present in an amount of at least 2 weight percent and preferably not greater than 8 weight percent, and fibers disclosed in U.S. Pat. Nos. 5,208,105 & 5,506,042 having 8 to 40 weight percent of an antimony compound. The preferred modacrylic fiber is commercially available Protex C from Kaneka Corporation, Japan, which is said to contain 10 to 15 weight antimony oxides, although fibers having less antimony oxide, in the range of 6 weight percent or less, can also be used.

The crimped organic fibers are held in place with up to 30 parts by weight binder material. The preferred binder material is a combination of binder fiber and binder powder that is activated by the application of heat. Binder fibers are typically made from a thermoplastic material that flows at a temperature that is lower (i.e., has a softening point lower) than the softening point of any of the other staple fibers in the fiber blend. Sheath/core bicomponent fibers are preferred as binder fibers, especially bicomponent binder fibers having a core of polyester homopolymer and a sheath of copolyester that is a binder material, such as are commonly available from Unitika Co., Japan (e.g., sold under the trademark MELTY®). Useful types of binder fibers can include those made from polypropylene, polyethylene, or polyester polymers or copolymers, the fibers containing only that polymer or copolymer, or as a bicomponent fiber in side-by-side or sheath/core configuration. Preferably the binder fibers are present in an amount of up to 20 percent of the reinforced nonwoven fabric. Binder powder is preferably present in an amount of up to 30 percent of the reinforced nonwoven fabric. The preferred binder powder is a thermoplastic binder powder such as copolyester Griltex EMS 6E adhesive powder.

The reinforced nonwoven fabric of this invention also contains an open mesh scrim. Such scrims preferably have a basis weight in the range of 3.4 to 34 g/m$^2$ (0.1 to 1.0 oz/yd$^2$) and are referred to as an "open mesh" scrim because these scrims have only 0.8 to 6 ends per centimeter (2 to 15 ends per inch). The most preferred open mesh scrims have a basis weight in the range of 6.8 to 17 g/m$^2$ (0.2 to 0.5 oz/yd$^2$) and have preferably 1 to 4 ends per centimeter (3 to 10 ends per inch), in both the warp and fill direction. Preferably, the mesh is made by binding together two sets of cross-plied polyester continuous filaments or continuous filament yarns that have a binder coating. Representative open mesh scrims are available from Saint-Gobain Technical Fabrics of Niagara Falls, N.Y. under the name of Bayex® Scrim Fabrics. Two styles of the Bayex® open mesh scrims are especially useful in the reinforced nonwoven fabrics of this invention. Bayex® Product Number KPM4410/P3 is made from 78 dtex (70 denier) continuous polyester filaments in both the warp and fill directions and has 1.6 ends per cm (4 ends per inch) in both directions. It has a basis weight of 6.8 g/m$^2$ (0.2 oz/yd$^2$) and the continuous filament has a thermoplastic coating that holds the cross-plied filaments in place. Also, Bayex® Product Number KPM10510/P3 is made from 78 dtex (70 denier) continuous polyester filaments in the warp and 167 dtex (150 denier) continuous polyester filaments in the fill direction and has 4 ends per cm (10 ends per inch) in the warp direction and 2 ends per cm (5 ends per inch) in the fill direction. It has a basis weight of 12.1 g/m² (0.36 oz/yd²) and the continuous filament has a thermoplastic coating that holds the cross-plied filaments in place.

This type of scrim provides adequate strength while not excessively contributing to flammability. It is also believed the open mesh also contributes to the formation of open pockets of air in the fabric when the fabric is exposed to high heat because a mesh scrim should restrain less of the heat resistant fibers due to the small number of binding points with the fibrous webs. The scrim can be comprised of thermoplastic or non-thermoplastic filaments, and can be aramid, nylon, glass, or polyester. If the scrim is a thermoplastic such as polyester, when the nonwoven fabric is burned, this mesh essentially disappears in the burned area as the crimped heat resistant fibers are bulking.

This invention also relates to a process for making a reinforced nonwoven fabric that bulks in heat or flame for fire blocking an article, comprising the steps of:
  a) forming a mat comprising crimped heat-resistant organic fiber and binder fiber,
  b) contacting the mat with the first side of an open mesh scrim, said scrim having a first and a second side, to form a fabric assembly,
  c) applying binder powder to the fabric assembly,
  d) heating the fabric assembly to activate the binder fiber and binder powder,
  e) compressing the fabric assembly to a compressed state, and
  f) cooling the fabric assembly in a compressed state to form a reinforced nonwoven fabric.

The mat may be formed by any method that can create low-density webs. For example, clumps of crimped staple fibers and binder fibers obtained from bales of fiber can opened by a device such as a picker. Preferably these fibers are staple fibers having a linear density of about 0.55 to about 110 dtex per filament (0.5 to 100 denier per filament), preferably 0.88 to 56 dtex/filament (0.8 to 50 denier/filament) with the linear density range of about 1 to 33 dtex/filament (0.9 to 30 denier/filament) being most preferred.

The opened fiber mixture can be then blended by any available method, such as air conveying, to form a more uniform mixture. Alternatively, the fibers can be blended to form a uniform mixture prior to fiber opening in the picker. The blend of fibers can then be converted into a fibrous web by use of a device such as a card, although other methods, such as air-laying of the fibers may be used. It is preferable that the fibrous web be used directly from the card without any crosslapping. However, if desired the fibrous web can then be sent via conveyor to a device such as a crosslapper to create a crosslapped structure by layering individual webs on top of one another in a zig-zig structure.

Fibrous webs from one or more cards and a open mesh scrim can then be collected on a transporting belt. Preferably the scrim is inserted between two webs to make a two web structure, although a single web structure can be made by overlaying a scrim over a single web or a single web over the scrim. Additional webs can be laid on either of the one or two web structures if needed. Preferably the final structure has two carded webs on one side of the open mesh scrim and one carded web on the other side of the scrim. Binder powder is then applied to the combined webs and scrim in a preferred amount of about 3.4 to 24 g/m² (0.1 to 0.7 oz/yd²). The combined webs, binder powder, and scrim are then conveyed through an oven at a temperature sufficient to soften and partially melt the binder fiber and powder and allow it to adhere the fibers together. At the oven exit the sheet is preferably compressed between two steel rolls to consolidate the layers into a cohesive fabric. The fabric is then cooled in this compressed state.

This invention further relates to a method of fire blocking an article, comprising the steps of (1) combining a layer of reinforced nonwoven fire blocker fabric, a fabric ticking or upholstery layer, and optionally a cushioning layer; (2) sewing the layers together to form a fire blocked quilt or upholstery fabric, and (3) incorporating the fire blocked quilt or upholstery fabric into the article. The reinforced nonwoven fire blocker fabric comprises an open mesh scrim having a first side and a second side, the first side having crimped, heat-resistant organic fibers compressed thereon, the fibers held in a compressed state by a thermoplastic binder, wherein when the fabric is exposed to heat or flame, the fabric is capable of increasing its thickness by at least three times. Preferably organic fibers are compressed on both the first and second sides of the open mesh scrim.

The combination of reinforced nonwoven fire blocker fabric, fabric ticking or upholstery layer, and optionally a cushioning layer, are sewn or stitched together to form a pre-stitched quilt and these quilts can have many forms. A basic example of a quilt comprises, in order, an outer fabric ticking or cover fabric layer, one or more layers of the reinforced nonwoven fabric fire blocker of this invention, a cushioning layer of foam or fiber batting, and a stitch-backing layer. The layers are combined and then stitched together using any common stitch pattern, typically a quilting pattern, to form a quilt that is used in the mattress borders and panels as needed.

Fabrics useful as the outer fabric ticking or cover fabric layer are normally very durable woven or knit fabrics utilizing any number of weaves, and tend to have basis weights in the range of 2 to 8 ounces per square yard (68 to 271 grams per square meter). Ticking fabrics may contain but are not limited to cotton, polyester fibers, polypropylene fibers, or rayon fibers.

The optional cushioning layer of foam or fiber batting may include one or more light density fibrous batting or foams, or a combination thereof that provides the desired surface effect or cushion. The batting and/or foams acts like a pillow underneath the ticking, providing very tactile cushioning, the type that can be readily discerned by simply touching or running one's hand across the mattress. The preferred fibrous batting material is polyester (PET) batting and is typically present in an amount of about 0.5 to 2.0 ounces per square foot (153 to 610 grams/square meter). While not intended to be limiting, if the cushioning material is a fibrous batting, such batting may include a vertically pleated structure such as disclosed in, for example, in PCT Publication WO2003049581 or a batting of fibers such as disclosed for example in U.S. Pat. No. 3,118,750. If foam is used, it is commonly polyurethane or latex foam and is typically 0.5 to 3 inches (1.2 to 7.6 cm) thick.

The stitch-backing layer is typically used to hold the stitch on the side of the quilt opposite the ticking when the cushioning material is not substantial enough to hold a stitch. Typically, stitch-backing layers are lightweight fabrics having a basis weight in the range of 0.5 ounces per square yard (17 grams per square meter) and are made from materials such as polypropylene.

An alternative quilt layer configuration can be, in order, an outer ticking or upholstery layer, a layer of cushioning material, and one or more layers of the reinforced nonwoven fabric fire blocker, wherein the cushioning material is sandwiched between the fire blocker and the ticking. In this quilt, no stitch backing is needed because the fire blocker serves the purpose of holding the stitch. Another version of the quilt can be made with multiple layers of cushioning material. For example, a quilt can be formed by combining, in order, outer ticking or upholstery fabric, a layer of cushioning material, one or more layers of the reinforced nonwoven fabric fire blocker, another layer of cushioning material, and then a stitch-backing layer.

Another possible quilt configuration is one in which one layer of the reinforced nonwoven fabric fire blocker of this invention is placed directly under the outer cover fabric, followed by a cushioning layer, with a second layer of the reinforced nonwoven fabric fire blocker under the cushioning layer. In this configuration the last layer of reinforced nonwoven fabric fire blocker also functions as a stitch backing. In an alternative version of this particular quilt configuration, another layer of cushioning can be disposed between the cover fabric and the reinforced nonwoven fabric fire blocker.

Still another quilt configuration could be comprised of an outer ticking or upholstery layer and one or more layers of the reinforced nonwoven fabric fire blocker of this invention, with no substantial cushioning layer. As one can see, many different quilts are possible and other layers of materials can be combined in the quilts as long as the fire-blocking performance of the quilt is not adversely affected.

The pre-stitched quilts may then be incorporated into an article such as a piece of furniture, or preferably, a mattress and foundation set. One method of fire blocking the mattress is by fully covering the panels and borders of the mattress core with the pre-stitched quilts, and sewing the quilts together at the seams to encapsulate the mattress. This insures the mattress will be fire blocked regardless of which panel or border is exposed to the flame. Pre-stitched quilts of various types can be incorporated into an article, such as a quilt having little cushioning can be used in the border of a mattress while a quilt having a considerable amount of cushioning can be used in the top and bottom panels of the same mattress. Foundations, such as box springs, do not normally have to be completely fire blocked but generally are only required to have fire blocking on the borders with fire blocking being optional for the top face or panel of the foundation. This foundation panel is normally in contact with the mattress and is thus generally shielded from flame so the material used in the foundation panel does not typically have to have the same degree of fire blocking as the panel of the mattress. Further, the mattress foundation may not have a large degree of cushioning material in the border and/or the panel. However, the reinforced nonwoven fabric of this invention can be used in either the foundation border or panel as desired.

The reinforced nonwoven fabric provides adequate fire blocking to an article unable to pass California Technical Bulletin 603 issued July 2003, to enable that article to pass California Technical Bulletin 603 issued July 2003 without addition of a chemical flame retardant material. The reinforced nonwoven fabric can be incorporated into the article, such as a mattress, in any manner that allows that mattress to past the test when it would otherwise not pass.

TEST METHODS

ThermoGravametric Analysis

The fibers used in this invention retain a portion of their fiber weight when heated to high temperature at a specific heating rate. This fiber weight was measured using a Model 2950 Thermogravimetric Analyzer (TGA) available from TA Instruments (a division of Waters Corporation) of Newark, Del. The TGA gives a scan of sample weight loss versus increasing temperature. Using the TA Universal Analysis program, percent weight loss can be measured at any recorded temperature. The program profile consists of equilibrating the sample at 50 degrees C.; ramping the temperature at from 10 or 20 degrees C. per minute from 50 to 1000 degrees C.; using air as the gas, supplied at 10 ml/minute; and using a 500 microliter ceramic cup (PN 952018.910) sample container.

The testing procedure is as follows. The TGA was programmed using the TGA screen on the TA Systems 2900 Controller. The sample ID was entered and the planned temperature ramp program of 20 degrees per minute selected. The empty sample cup was tared using the tare function of the instrument. The fiber sample was cut into approximately 1/16" (0.16 cm) lengths and the sample pan was loosely filled with the sample. The sample weight should be in the range of 10 to 50 mg. The TGA has a balance therefore the exact weight does not have to be determined beforehand. None of the sample should be outside the pan. The filled sample pan was loaded onto the balance wire making sure the thermocouple is close to the top edge of the pan but not touching it. The furnace is raised over the pan and the TGA is started. Once the program is complete, the TGA will automatically lower the furnace, remove the sample pan, and go into a cool down mode. The TA Systems 2900 Universal Analysis program is then used to analyze and produce the TGA scan for percent weight loss over the range of temperatures.

Mattress Burn Performance

The Bureau of Home Furnishings and Thermal Insulation of the Department of Consumer Affairs of the State of California (3485 Orange Grove Avenue, North Highlands, Calif. 95660-5595, USA) published Technical Bulletin 603 "Requirements and Test Procedure for Resistance of a Residential Mattress/Box Spring Set to a Large Open-Flame" dated February 2003 to quantify the flammability performance of mattress sets. The bulletin was later revised in July 2003, requiring the limit of Peak Heat Release Rate (PHRR) to be less than 200 kilowatts and the Total Heat release limit at 10 minutes to be less than 25 megajoules. This protocol provides a means of determining the burning behavior of mattress/foundation sets by measuring specific fire test responses when the mattress plus foundation are exposed to a specified flaming ignition source under well-ventilated conditions. It is based on the National Institute of Standards and Technology Publication titled "Protocol of Testing Mattress/Foundation Sets Using a Pair of Gas Burners" dated February 2003.

Test data are obtained that describe the burning during and subsequent to the application of a specific pair of gas burners from the point of ignition until (1) all burning of the sleep set has stopped, (2) a period of 30 minutes has elapsed, or (3) flashover of the test room appears inevitable. The rate of heat release from the burning test specimen (the energy generated by the fire) is measured by oxygen consumption calorimetry. A discussion of the principles, limitations, and requisite instrumentation are found in ASTM E 1590 "Standard Test Method of Fire Testing of Mattresses". Terminology associated with the testing is defined in ASTM E 176 "Standard Terminology of Fire Standards".

In general, the test protocol utilizes a pair of propane burners, designed to mimic the heat flux levels and durations imposed on a mattress and foundation by burning bedclothes. The burners impose differing fluxes for differing times on the mattress top and the side of the mattress/foundation. During and subsequent to this exposure, measurements are made of the time-dependent heat release rate from the test specimen.

The mattress/foundation is placed on top of a short bed frame that sits on a catch surface. During the testing, the smoke plume is caught by a hood that is instrumented to measure heat release rate. For practicality, twin-sized mattresses and foundations are tested. After ignition by the burners, the specimen is allowed to burn freely under well-ventilated conditions.

The test specimen includes a mattress that is placed on foundation with T-shaped burners set to burn the specimen. One burner impinges flames on the top surface of the mattress and is set 39 mm from the surface of the mattress. The second burner impinges flames vertically on the side of the mattress/foundation combination and is set 42 mm from the side of the specimen. The side burner and the top burner are not set at the same place along the length of the specimen but are offset from on another along the length approximately 18 to 20 cm. The burners are specially constructed and aligned per the test method.

The test specimen is conditioned for 24 hours prior to the testing at an ambient temperature of above 12 Celsius (54 Fahrenheit) and a relative humidity of less than 70 percent. The test specimen of mattress and foundation is centered on each other and the frame and catch surface. If the mattress is 1 to 2 cm narrower than the foundation the mattress may be shifted until the sides of the mattress and foundation are aligned vertically. The burners are aligned and spaced from the specimen per the standard. Data recording and logging devices are turned on at least one minute prior to ignition. The burners are ignited and the top burner is allowed to burn for 70 seconds while the side burner is allowed to burn for 50 seconds (if possible) and then they are removed from the area. Data collection continues until all signs of burning and smoldering have ceased or until one hour has elapsed.

Vertical Flame Test

Vertical flame performance of the reinforced nonwoven fabric was measured using ASTM D6413-99.

Thickness

Thickness measurement of the reinforced fabric of this invention prior to bulking can be measured using ASTM D1777-96 Option 1. However, most standard methods of thickness measurements require the application of some type of weight on the sample to be measured. Therefore, to get a true reading of thickness and not perturb the "bulkiness" of bulked samples that had experienced high heat or flame, thickness results for Example 2 were based on scanning electron microscopy (SEM) measurements of cut samples. The test samples were cut by a sharp pair of scissors and mounted on the SEM sample stud.

EXAMPLE 1

A reinforced nonwoven fabric was prepared as follows. 90 parts by weight 2.2 dpf, 2" cut length Type 970 Kevlar® brand staple fiber and 10 parts 4 dpf, 2" cut length Type 4080 Unitika binder fiber were blended as fed from bales to three cards. Fiber webs from the three cards were collected on a transporting belt to create a fiber mat having a basis weight of approximately 1.1 oz/yd². An open mesh scrim of polyester filament yarn was inserted between the two webs formed by the first two cards. The open mesh scrim was a Saint Gobain 5×10 scrim (Type KPMR10510/P3 having 5 ends/inch of 150 denier polyester in the fill direction and 10 ends/inch of 70 denier polyester in the warp direction) and had a basis weight of 0.37 oz/yd². The resulting structure had two carded webs on one side of the open mesh scrim and one carded web on the other side of the scrim.

Griltex 763305 20 EMS adhesive powder was applied to the combined webs and scrim in an amount that brought the total sheet weight to 2 oz/yd². The combined webs, binder powder, and scrim were conveyed through an oven at 285° C. to melt the binder fiber and powder. At the oven exit the sheet was compressed between two steel rolls with 0" gap, which consolidated the components into a cohesive fabric. The fabric then cooled in this compressed state.

The final composition of the fabric was approximately 50% Kevlar® fiber, 6% binder fiber, 19% polyester scrim and 25% binder fiber. The fabric had a thickness of approximately 23 mils per ASTM D1777-96 Option 1. The fabric had a grab strength of 30 lbs-force in the warp direction and 22 lbs-force in the fill direction. In a 12 sec vertical burn test, the char length was 3.7" with a 5.6 second afterflame in the warp direction and the char length was 2.2" with a 1.3 sec afterflame in the fill direction. No dripping was observed. It was noted that the heat of the flame caused the thickness of the material in the vicinity of the flame to visually increase greater than 3× the fabric original thickness.

The fabric was tested as a fire barrier in single and double sided mattresses per TB 603. For the quilted top panel of the mattress the fire barrier was positioned under a layer of ¾" polyester batting beneath the ticking. For the mattress and boxspring borders the fire barrier fabric was positioned under a layer of 3/16"" foam under the ticking. The mattresses were IBC Celebrity construction.

For single-sided mattresses, the top panel quilt was constructed of stitched layers that were, in order, a layer of white woven ticking having a Mosaic style of polyester and polypropylene fibers; a layer of ¾" polyester batting; the fire blocker fabric of this invention; 3 layers of polyester foam, each layer having a 7/16" thickness; and finally a polystitch backing layer (for holding the stitching on the back side of the quilt).

The top panel of the single-sided mattress was constructed of the top panel quilt; a layer of 1/½" convoluted polyurethane foam; a layer of 7/16" polyurethane foam; and gray felt insulator pad, which was positioned against 522 Highpro mattress springs. The bottom panel of the mattress was constructed, outward from the mattress springs, with gray felt insulator pad against the springs; a layer of 1/¾" polyurethane foam; and an outer skid pad, which was constructed from a 4 oz/yd2 spunlaced fabric made from 25% Kevlar® aramid fiber and 75% Visil® 33AP cellulosic fiber. The border quilt was constructed of stitched layers that were, in order, a layer of white woven ticking having a Mosaic style of polyester and polypropylene fibers; a layer of 3/16" polyurethane foam; the fire blocker fabric of this invention; and finally a polystitch backing layer (for holding the stitching on the back side of the quilt). The mattress panels were quilted with non-FR thread, the seams were sewn with Kevlar® aramid thread, and the FR polyester tape was used with the seams.

The top panel of the box spring used with the mattress had a non-skid pad on the surface, which was a 4 oz/yd2 spunlaced fabric made from 25% Kevlar® aramid fiber and 75% Visil® 33AP cellulosic fiber secured to cardboard. The material extended dow the sides approximately 1" and the top was secured to the border with a 2" continental border. The border used in the box spring was the same as that used in the mattress. The seams were sewn using Kevlar® aramid thread and FR polyester tape was used with the seams.

For double-sided mattresses, both the top and bottom panel quilts were constructed the same as the top panel quilts for the single-sided mattress. The border quilt was also constructed the same as that for the single-sided mattress and the panels were quilted and sewn in a manner similar to the single-sided mattress. The box springs were prepared the same as for the single-sided mattress.

Both single sided and double sided mattresses were burned per TB 603 and met the criteria of peak heat release of less than 200 kW at 30 minutes from burner ignition.

EXAMPLE 2

This example illustrates the bulking behavior of the reinforced fabric of this invention. A reinforced nonwoven fabric was prepared similar to Example 1. This fabric had a initial thickness of 0.32 mm (12 mils). The samples of the fabric were placed in a heated oven operating at different temperatures and the time noted when initial bulking of the sample was visually detected. Visual monitoring of the samples continued and the time to essentially full bulking of the samples varied with temperature, with essential full bulking occurring at about five minutes for the sample tested at 150° C. to about 1.5 minutes for the sample tested at 250° C. The samples remained in the oven for a total of 15 minutes and the final bulking thickness recorded. In addition, a sample was held in flame and it immediately bulked to essentially its maximum thickness. Its final thickness increased to 9.38 mm, an increase of 29 times. Final bulking thickness was measured by cross-sectioning the bulked fabric and measuring the thickness using SEM.

TABLE

| Sample # | Temp (° C.) | Duration (min) | Initial Bulking Time (sec) | Thickness (mm) |
|---|---|---|---|---|
| A | Control | — |  | 0.32 |
| 1 | 150 | 15 | 90 | 1.04 |
| 2 | 200 | 15 | 30 | 2.09 |
| 3 | 225 | 15 | Immediate | 3.94 |
| 4 | 250 | 15 | Immediate | 4.62 |

What is claimed is:

1. A reinforced nonwoven fabric for fire blocking an article, comprising an open mesh scrim having a first side and a second side, the first side having crimped, heat-resistant organic fibers compressed thereon, the fibers held in a compressed state by a thermoplastic binder,
wherein when the fabric is exposed to heat or flame, the fabric increases its thickness by at least three times.

2. The reinforced nonwoven fabric of claim 1 wherein the fabric increases its thickness by at least five times when the fabric is exposed to heat or flame.

3. The reinforced nonwoven fabric of claim 1 wherein the fabric increases its thickness by at least ten times when the fabric is exposed to heat or flame.

4. The reinforced nonwoven fabric of claim 3 wherein the fibers are held in a compressed state by the combination of thermoplastic binder and thermoplastic open mesh scrim.

5. The reinforced nonwoven fabric of claim 1 further comprising the crimped, heat-resistant organic fibers compressed on the second side of the scrim, the fibers held in a compressed state by a thermoplastic binder.

6. The reinforced nonwoven fabric of claim 1 wherein the open mesh scrim comprises thermoplastic material.

7. The reinforced nonwoven fabric of claim 1, wherein the thermoplastic binder is binder fiber.

8. The reinforced nonwoven fabric of claim 7, wherein the thermoplastic binder comprises a combination of binder fiber and binder powder.

9. The reinforced nonwoven fabric of claim 1, wherein the heat-resistant organic fiber is a para-aramid fiber.

10. The reinforced nonwoven fabric of claim 9 wherein the thermoplastic binder is a combination of polyester binder powder and polyester binder fibers, and the open mesh scrim is made from the same or different polyester polymer.

11. A fire blocked article comprising the reinforced nonwoven fabric of claim 1.

12. A fire blocked mattress comprising the reinforced nonwoven fabric of claim 1.

* * * * *